(No Model.)
C. COLAHAN.
GRAIN BINDER.
No. 358,919. Patented Mar. 8, 1887.
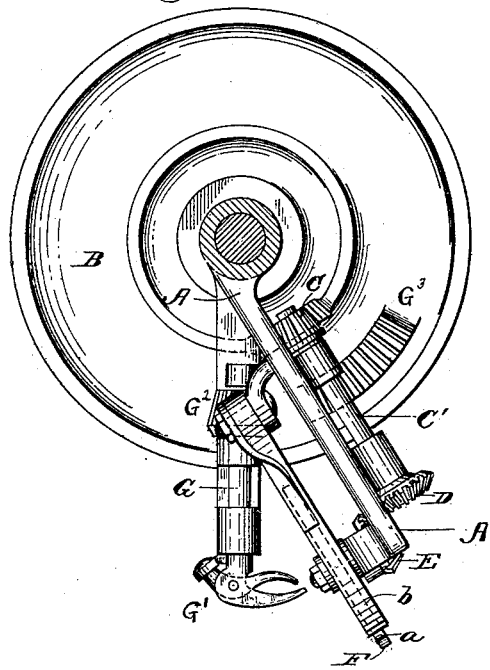
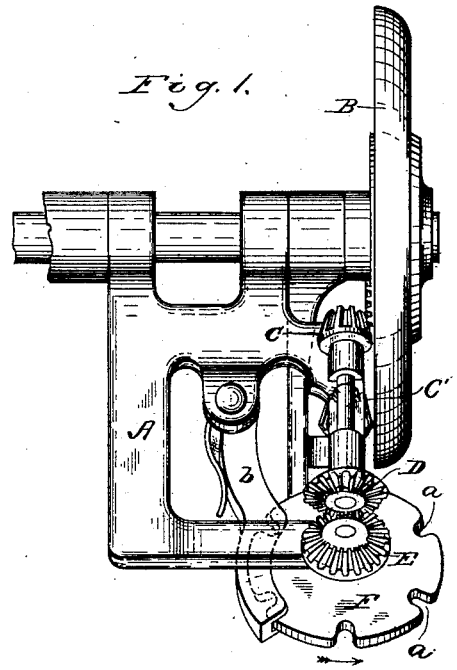
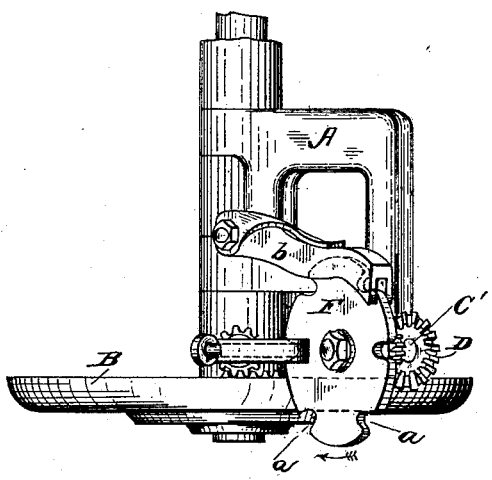
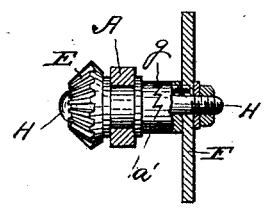
Witnesses.
Inventor.
Chas Colahan

UNITED STATES PATENT OFFICE.

CHARLES COLAHAN, OF CLEVELAND, OHIO.

GRAIN-BINDER.

SPECIFICATION forming part of Letters Patent No. 358,919, dated March 8, 1887.

Application filed August 6, 1883. Serial No. 103,007. (No model.)

*To all whom it may concern:*

Be it known that I, CHARLES COLAHAN, a citizen of the United States, residing at Cleveland, in the county of Cuyahoga and State of Ohio, have invented a new and useful Improvement in Grain-Binders, of which the following is a specification.

My invention relates to improvements in the device for holding and grasping the cord, in conjunction with vertically-revolving wheel actuating the tying device. I attain these objects by the mechanism illustrated in the accompanying drawings, in which—

Figure 1 is a side view. Fig. 2 is an end view. Fig. 3 is a bottom view, and Fig. 4 is a sectional view showing the disk and its actuating-pinion, also the serrated connection and retaining-bolt, with its nut for the purpose of adjustment, as hereinafter described.

A represents the supporting-frame.

B represents the main wheel, with its segment gears and cams for actuating the cord-holder and knot-tying devices.

C, D, and E are the pinions actuating the cord seizing and holding disk F.

$g$ shows the connection between the serrated hub of the cord-holding disk F.

C' is a shaft connecting the pinion C and D and the serrated hub or sleeve $a'$ upon the actuating-pinion E, the object of which is to admit of the adjustment of said disk to secure the proper relation or position of the notches $a$ to the spring plate or shoe $b$ with the actuating mechanism.

H is the bolt which, with its nut, is for securing together the said disk F and the actuating shaft or pinion E. When placed in proper position, the steel disk F is secured to its sleeve or hub by means of a pin screwed therein.

$b$ is a pivoted grooved pressure plate or shoe, which, with its spring, holds the cord onto the disk F securely.

G is the knotter-shaft; G', the knotter; and $G^2$, the pinion on the knotter-shaft that gears with a segment, $G^3$, on the wheel B.

I desire to claim as my invention—

1. The combination of the wheel B and its segments, the pinion C, shaft C', pinions D and E, the latter having the serrated sleeve $a'$, and the cord-grasping disk having the serrated hub, substantially as shown and described.

2. The combination, substantially as set forth, of the main driving-wheel, the knotter actuated thereby, the cord-holding disk having a serrated hub, the pinion E, having a serrated hub engaging with the hub of the disk, the bolt for connecting them together, and means for operatively connecting the pinion E with the main driving-wheel.

CHAS. COLAHAN.

Witnesses:
FREDERICK C. GOODWIN,
HENRY S. TOWLE.